July 7, 1953  E. W. MILLER  2,644,368
MULTIPLE SPINDLE PLANETARY GEAR GENERATING MACHINE
Filed Nov. 20, 1947  10 Sheets-Sheet 8

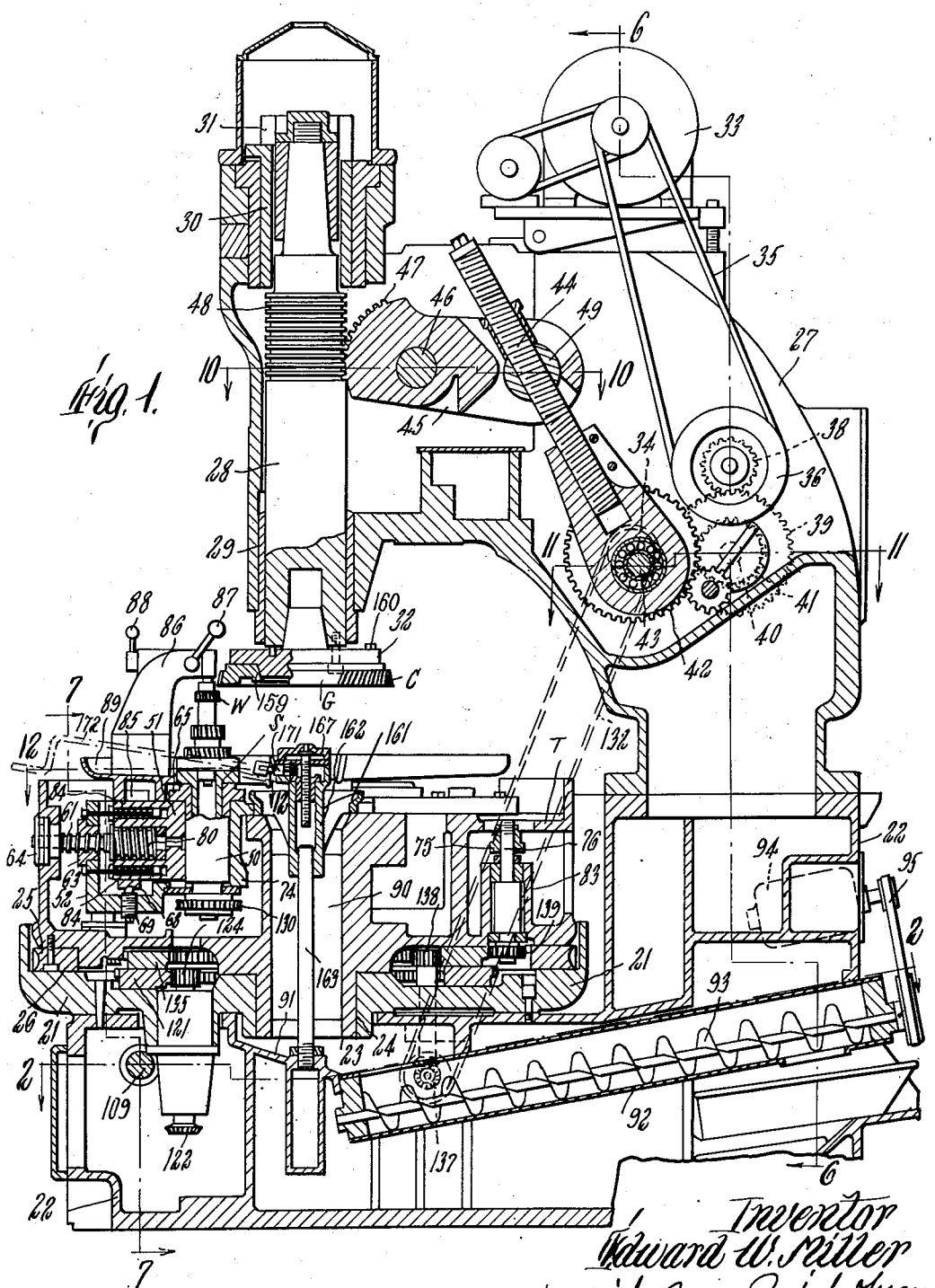

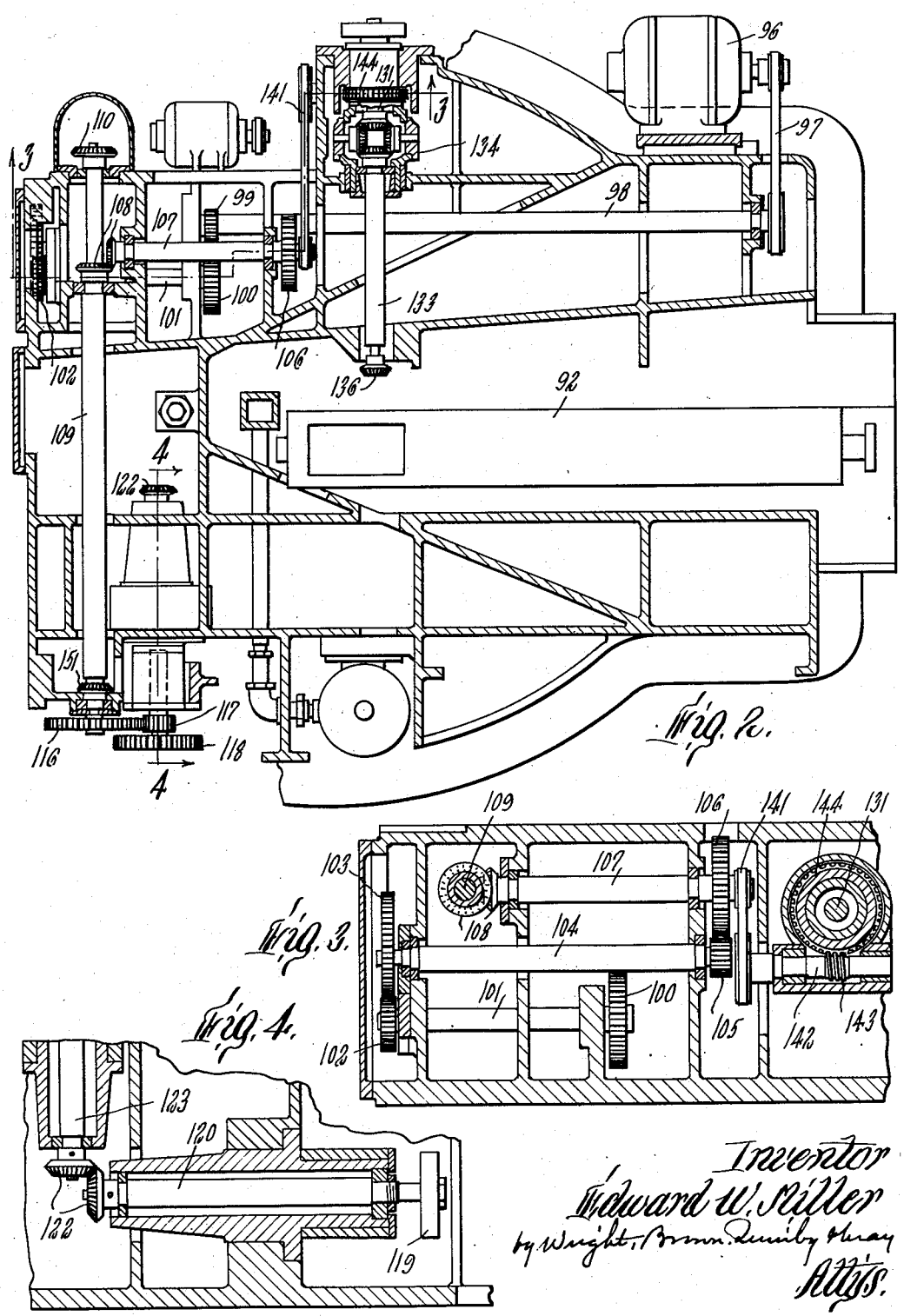

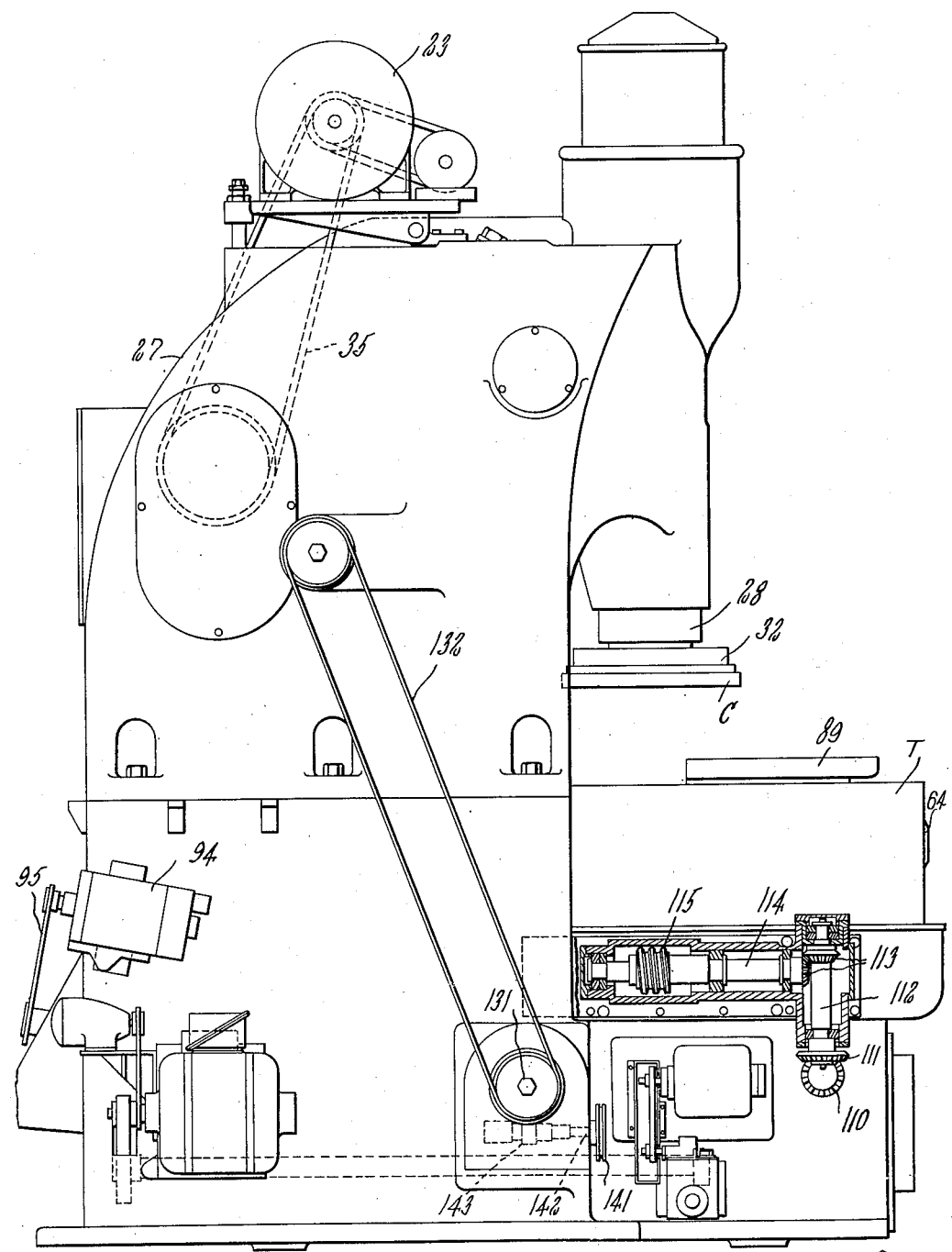

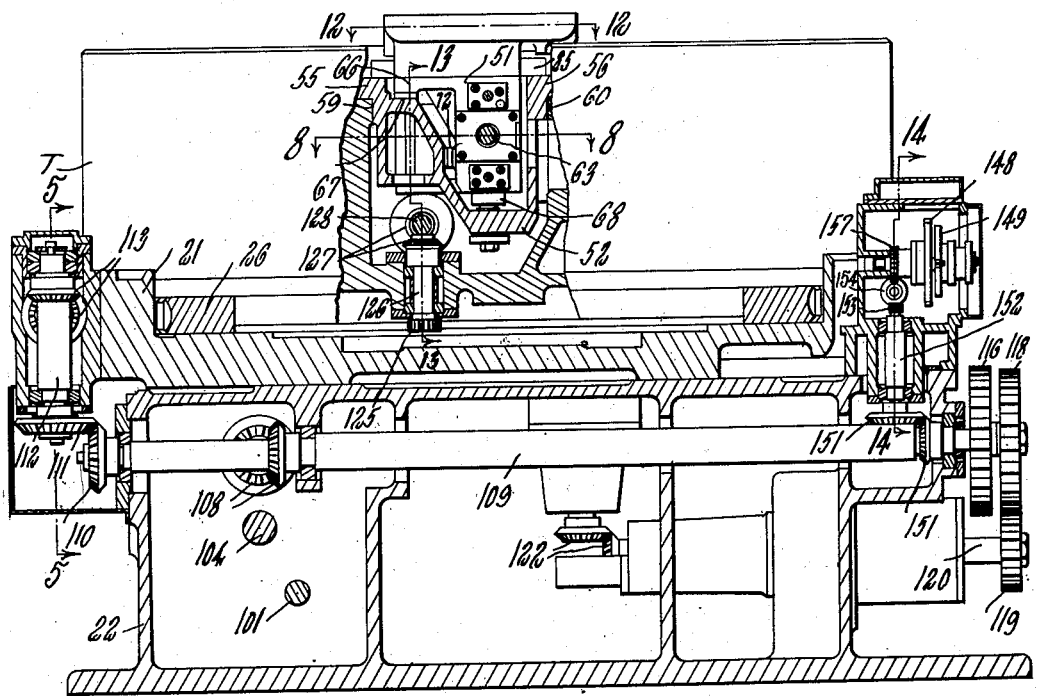

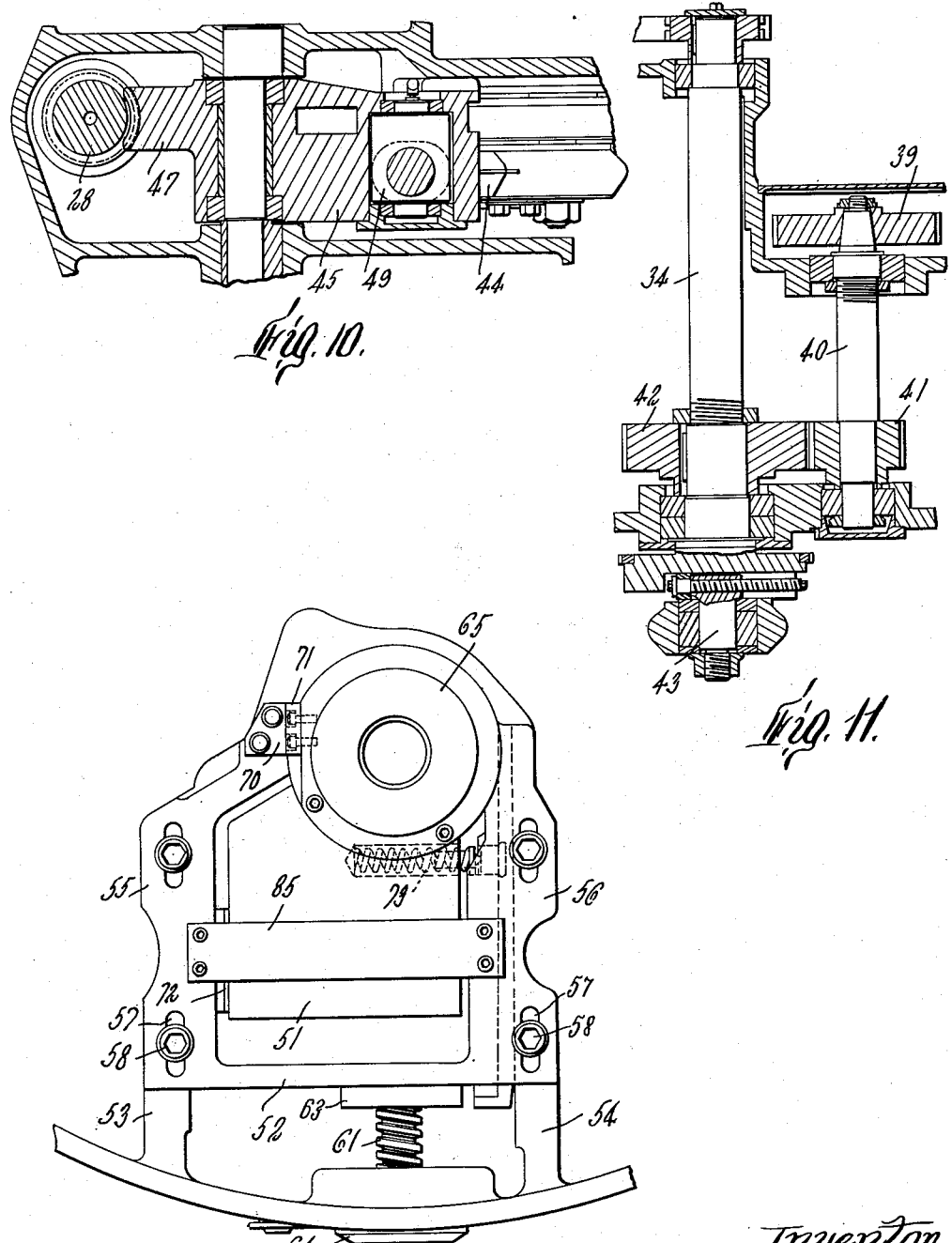

Inventor
Edward W. Miller
by Wright, Brown, Quinby & May
Attys.

July 7, 1953 E. W. MILLER 2,644,368
MULTIPLE SPINDLE PLANETARY GEAR GENERATING MACHINE
Filed Nov. 20, 1947 10 Sheets-Sheet 9

Inventor
Edward W. Miller
by Wright, Brown, Quinby & May
Attys.

July 7, 1953  E. W. MILLER  2,644,368
MULTIPLE SPINDLE PLANETARY GEAR GENERATING MACHINE
Filed Nov. 20, 1947  10 Sheets-Sheet 10
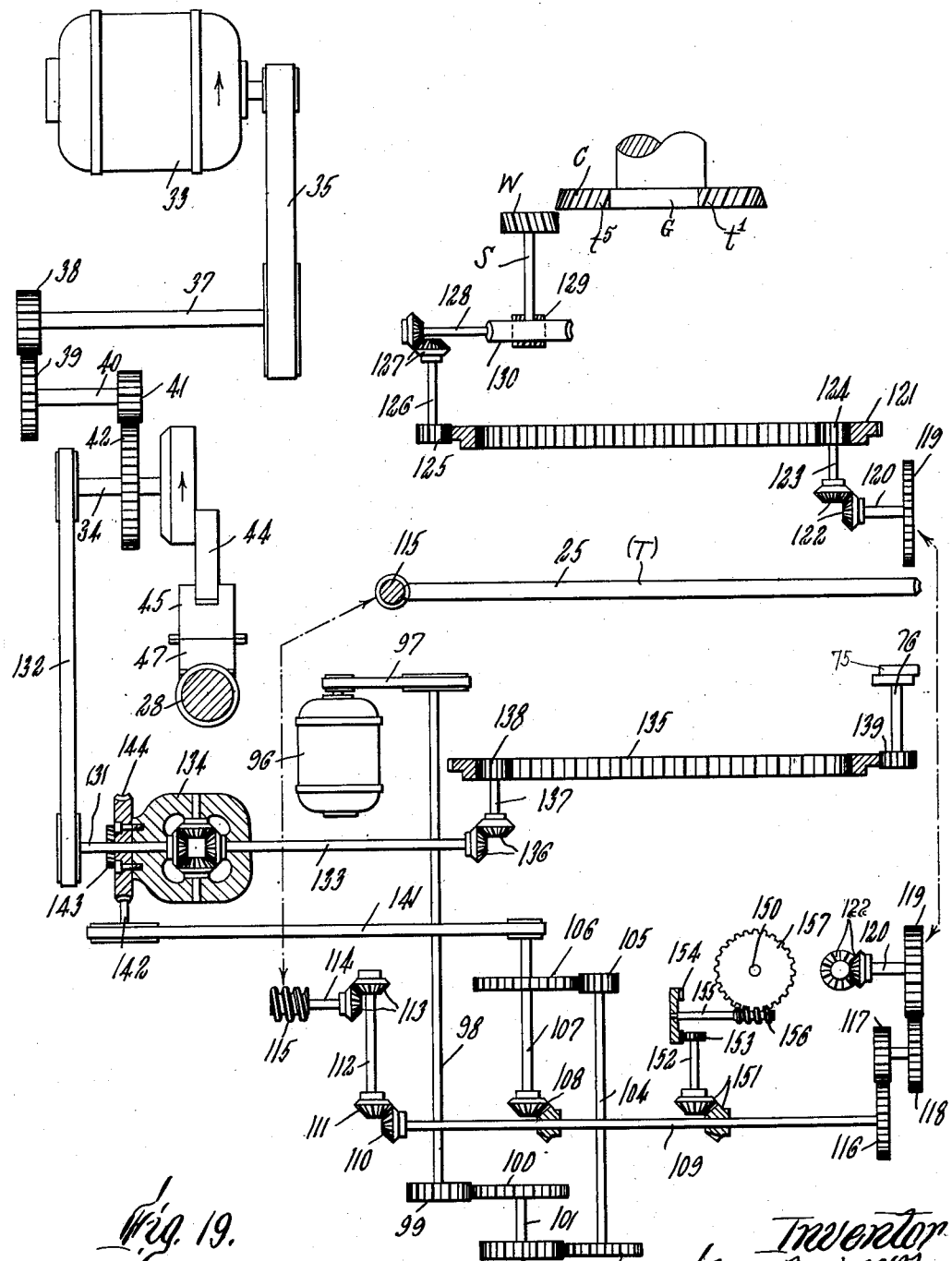
Fig. 19.

Patented July 7, 1953

2,644,368

UNITED STATES PATENT OFFICE 2,644,368

MULTIPLE SPINDLE PLANETARY GEAR GENERATING MACHINE

Edward W. Miller, Springfield, Vt., assignor to The Fellows Gear Shaper Company, Springfield, Vt., a corporation of Vermont Application November 20, 1947, Serial No. 787,047

15 Claims. (Cl. 90—7)

The present invention is concerned with gear shaping machines having a plurality of work spindles which are revolved in an orbit around a central gear shaping cutter and are rotated their axes at the same time and at suitable angular velocities to cause work pieces carried by them to roll in mesh with the cutter. The cutter meanwhile is reciprocated rapidly in axial alinement with the axis around which the work spindles revolve and is withheld from rotation about its axis, except when provided with helical teeth for generating helical gears, in which case it is given an angular movement back and forth simultaneously with its strokes in opposite directions conformably with the angular component of the helices in which its teeth are arranged. In its general nature it is like the planetary gear shaping machine disclosed in my prior Patent 1,990,240, granted February 5, 1935, but it includes novel features by which adjustment for accommodating work pieces of different diameters and substitution of different cutters for one another are simplified and made easier, protection is afforded against spoiling work pieces or injuring the cutter if a blank work piece is improperly loaded on a work spindle, improved means for backing off the work spindles to avoid rubbing during noncutting strokes of the cutter, and otherwise to improve the machine. The objects and novel characteristics of the invention can best be explained in connection with the description of a concrete embodiment.

The following specification and accompanying drawings disclose the salient features of a specific multiple spindle planetary gear shaping machine in which the invention is contained. In these drawings, Fig. 1 is a vertical section of the machine taken on a plane extending from front to rear through the alined axes of the cutter and of the orbit in which the work spindles are revolved;

Fig. 2 is an approximately horizontal section taken on line 2—2 of Fig. 1;

Figs. 3 and 4 are detail sections taken on lines 3—3 and 4—4, respectively, of Fig. 2;

Fig. 5 is a left hand side view of the machine and a partial section taken on line 5—5 of Fig. 7;

Fig. 7 is a vertical section taken on line 7—7 of Fig. 1;

Fig. 8 is a horizontal sectional view taken on line 8—8 of Fig. 7 and shown on a larger scale;

Fig. 9 is a detail section taken on line 9—9 of Fig. 8;

Figure 13:
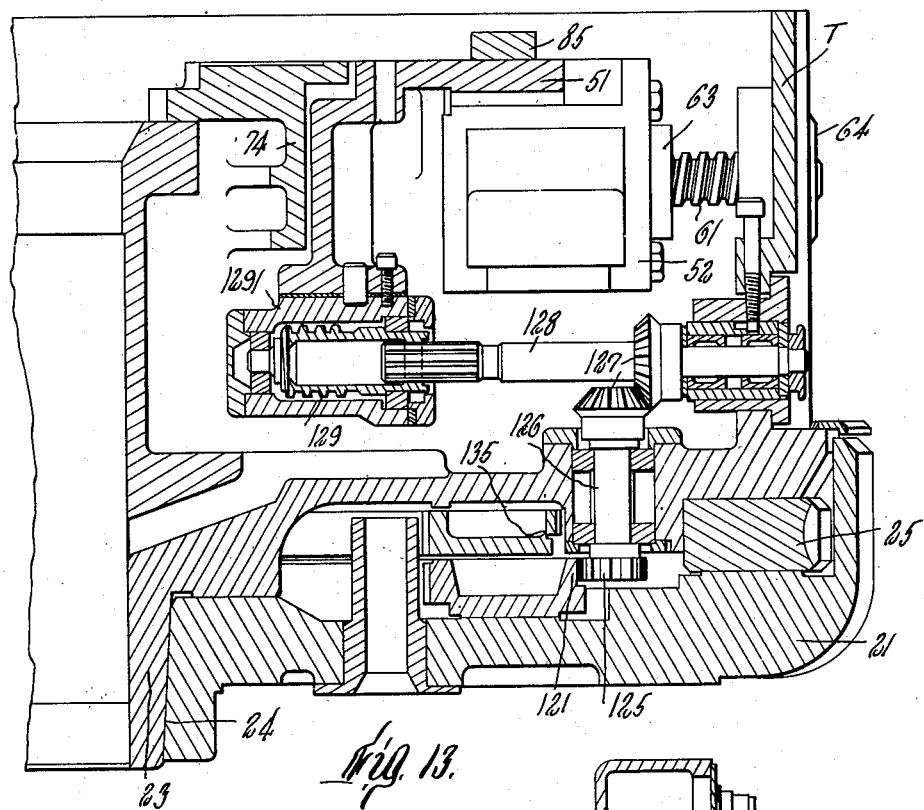
Figure 14:
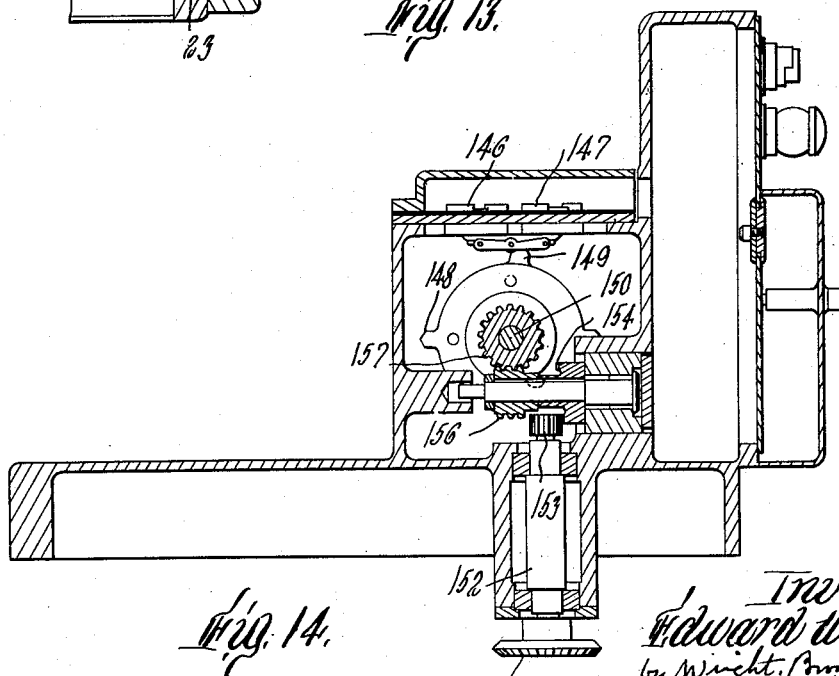
Figure 15:
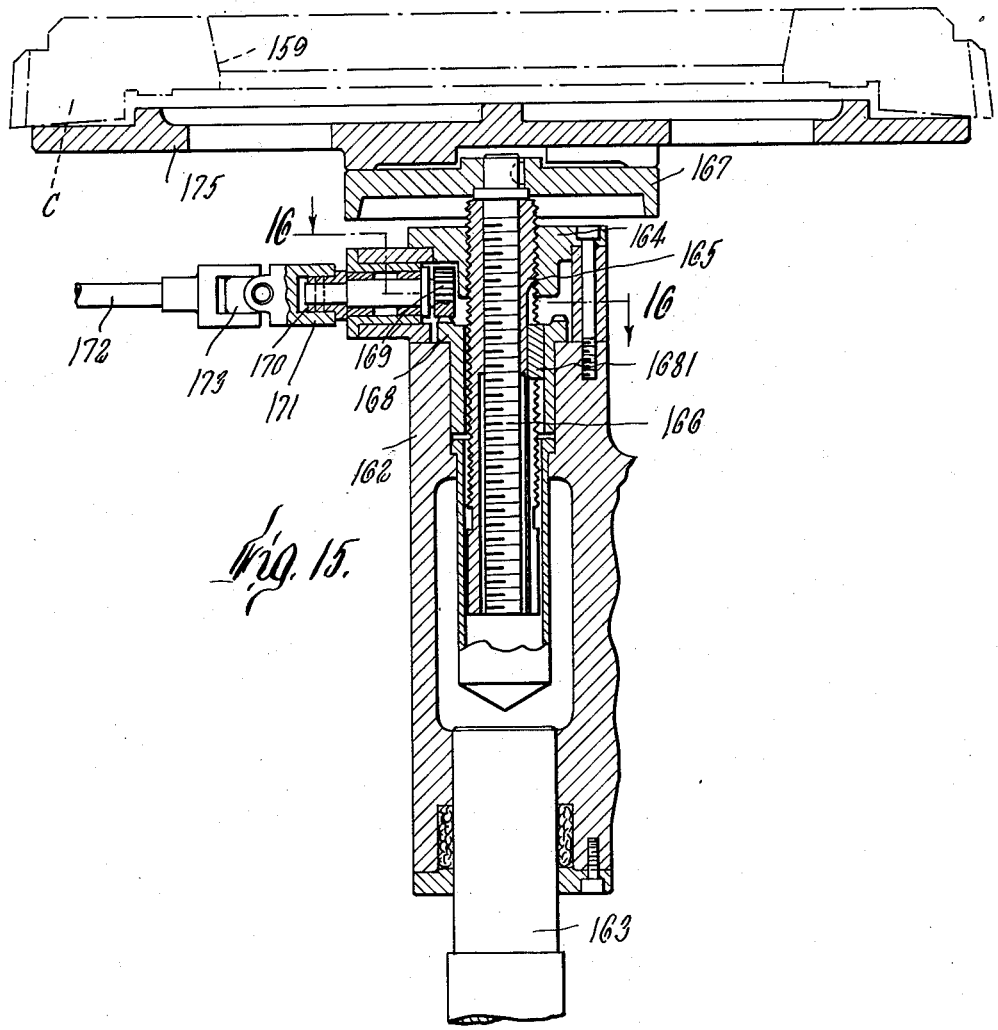
Figure 16:
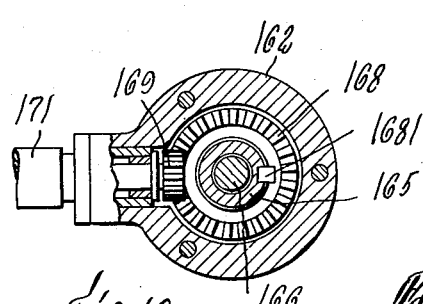
Figure 17:
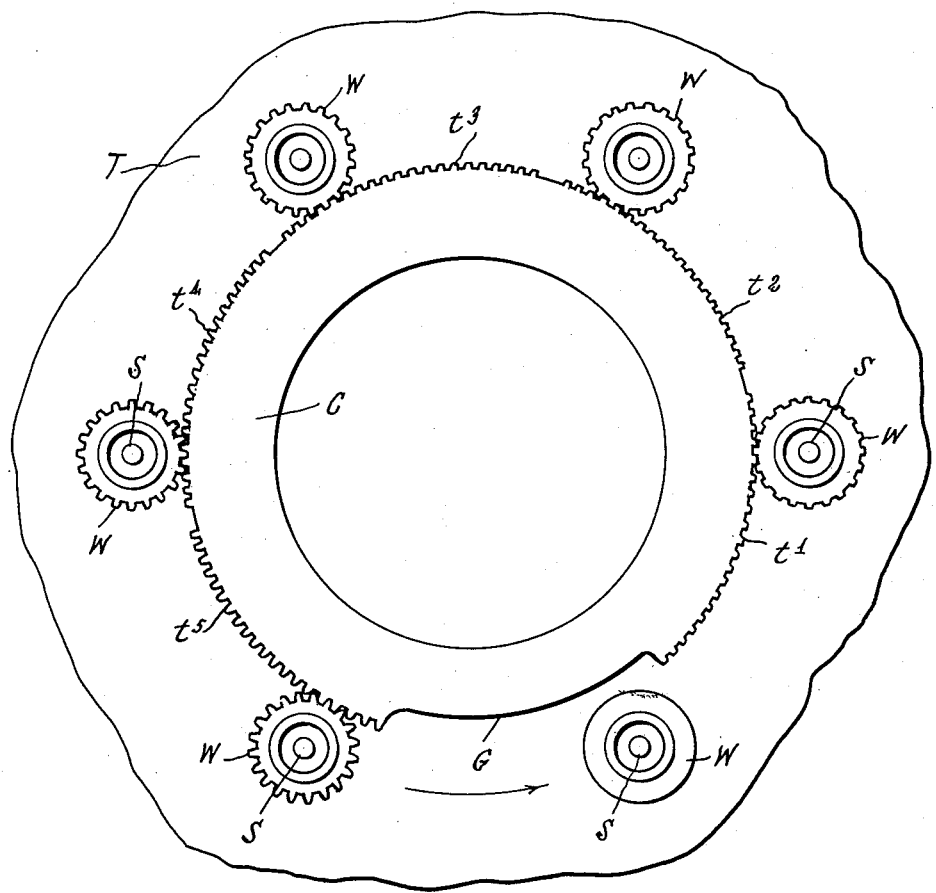
Figure 18:
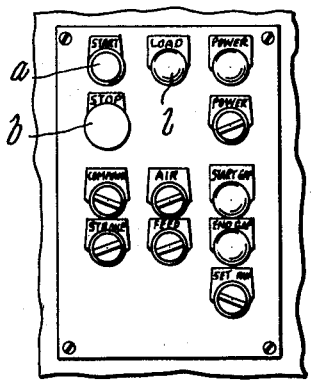

Figs. 10 and 11 are horizontal detail sections taken on lines 10—10 and 11—11, respectively, of Fig. 1;

Fig. 12 is a detail plan view of the parts below the line 12—12 of Figs. 1 and 7;

Fig. 13 is a detail vertical sectional view taken on line 13—13 of Fig. 7 and shown on a larger scale;

Fig. 14 is a detail sectional view taken on line 14—14 of Fig. 7;

Fig. 15 is a detail sectional view of a jack by which cutters are placed in connection with the cutter spindle of the machine;

Fig. 16 is a cross section on line 16—16 of Fig. 15;

Fig. 17 is a plan view of the cutter spindle and the work spindles of this machine, with work pieces thereon, in their operative relationship;

Fig. 18 is an elevation of a panel on which control switches for the operating circuits of the machine and signal lamps in such circuits are mounted;

Fig. 19 is a diagram showing the means by which motion is imparted to the operating elements of the machine and the interrelationship of the parts thereof.

Like reference characters designate the same parts wherever they occur in all the figures.

A number of work spindles S, shown in Fig. 17 as six, but there may be more or fewer, are mounted rotatably in a turret T which also is rotatable and the axis of rotation of which is parallel to the axes of the spindles. A circular cutter C of the gear shaper type is supported independently of the turret with its axis in alinement with the axis of the turret. The cutter is provided with a number of groups of teeth $t^1$, $t^2$, $t^3$, $t^4$ and $t^5$ disposed on a common pitch circle and formed with cutting edges on one end and with side clearance. All the teeth of each group are alike, but those of successive groups in sequence are of greater widths and heights than those of preceding groups in order to generate the teeth of work gears in a succession of steps. At one side of the cutter there is a gap G between the teeth $t^1$ of the first series and $t^5$ of the last series to provide room for removing finished work pieces W from the work spindles S, and placing blanks on them, when the spindles come adjacent to the gap in the course of their revolution. The work spindles are spaced around the turret axis and located at such distances therefrom that all of the work pieces, except the one beside the gap G, can be acted on by the cutter at the same time. The number of cutter teeth in each group is equal to, or may be greater than, the number of teeth to be cut in the work pieces in order that the entire tooth-bearing arc of each work piece will be acted on while traversing each group of teeth in rolling mesh therewith.

In the operation of the machine, a finished gear is removed from, and a gear blank placed on, each spindle as it traverses the cup G of the cutter; and the teeth are cut to progressively greater depths in all of the work pieces successively as they roll around the cutter.

Referring now to Fig. 1, the turret T is shown as supported on a circular plate or platen 21 which rests on, and is rigidly secured to, the machine base 22. A central tubular hub 23 projecting downward from the bottom of the turret occupies a bearing 24 in platen 21 and centers the turret. The end thrust bearing of the turret is afforded by an annular worm gear 25 which is secured to the bottom of the turret concentrically therewith and bears on a flat upper surface 26 of the platen near the circumference thereof.

A massive superstructure 27 is secured to the base and contains a guideway axially alined with the turret and its centering hub 23, in which a cutter spindle 28 is mounted to reciprocate endwise. Such guideway includes a bushing 29 surrounding the lower end portion of the spindle, and complemental guides 30 and 31 secured to the superstructure and the spindle, respectively. The latter guides have overlapping surfaces in the nature of splines, which may be parallel to the axis of the spindle for use with spur type cutters, or helical for cutters with helical teeth (such as the one illustrated in these drawings), and are interchangeable together with spur and helical cutters of various helical leads. The cutter is secured removably to an adapter 32, which is secured to the end of the spindle 28 below the bushing 29.

Figure 6:
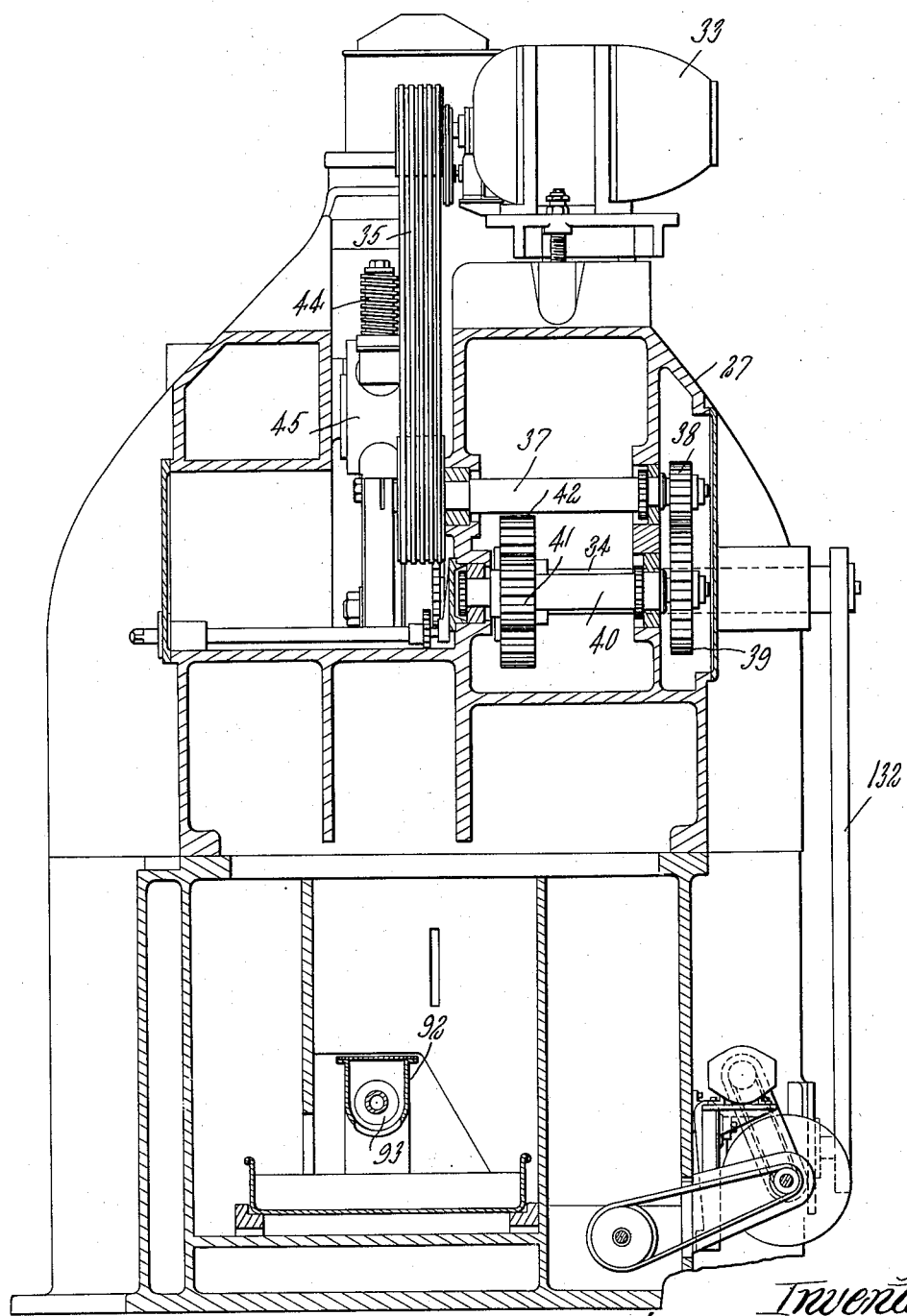
Fig. 6 is a vertical section taken on line 6—6 of Fig. 1 and viewed from the rear.

The cutter spindle is reciprocated by an electric motor 33 (Figs. 6 and 19) which drives a crank shaft 34 by means of a belt 35, pulley 36, shaft 37, change gears 38, 39, shaft 40 and gears 41 and 42, the last named of which is on the crank shaft. A crank pin 43, radially adjustable on the crank shaft (Fig. 11) is coupled by a connecting rod 44 with one arm of a lever 45 (pivoted at 46), the other arm of which is a gear segment 47 meshing with encircling rack teeth 48 on the spindle. This connecting rod is adjustable in length and as to the point along its length where it is engaged with a wrist pin 49 on lever 45, so that the position of the cutter, as well as the length of its stroke, can be regulated in accordance with work pieces of different characters.

One of the work spindles and the mechanisms by which it is mounted in the turret are shown in Fig. 1, with additional detailed showing in Figs. 7, 8 and 12. All the spindles and their movements are like, wherefore the following description of the one here shown in detail will suffice for all.

The spindle S is rotatable in a bearing sleeve 50 secured to an apron 51, which in turn is held by an apron carriage 52 supported on the turret structure. The apron 51 is movable on carriage 52 through a short distance radially, or approximately so, to the turret axis for the purpose of backing off the work to avoid rubbing contact with the cutter teeth during noncutting strokes of the latter, and bringing the work into operating position prior to cutting strokes; and the carriage 52 is adjustable radially for accommodating work pieces and cutters of different diameters to one another.

Carriage 52 is suspended between two ribs 53 and 54 of the turret structure, which lie on opposite sides of, and are parallel to, the common radial plane of the turret and spindle, being supported by flanges 55 and 56 which rest on the ribs and are provided with elongated slots 57 through which clamp bolts 58 pass. Lateral bearing surfaces 59 and 60 (Fig. 7) on the ribs and carriage accurately maintain the prescribed alinement of the carriage with the radius on which it is located.

Radial adjustment of the carriage 52 is effected by rotation of a screw 61, held rotatably, and against endwise movement, in the outer wall of the turret, which meshes with a nut 63 secured to the outer wall of the carriage. A graduated dial 64 secured to the outer end of screw 61 serves for applying torque to the screw and measuring adjustments of the carriage.

The carriage is of generally open box formation sufficiently deep to receive the apron 51 and bushing 50, with an opening in its bottom through which the lower end of the spindle S protrudes. The apron is supported in the carriage by a flange 65 on the upper end of bushing 50 (Fig. 1), a flange 66 (Fig. 7) which overlies and rests on a bearing surface 67, and a block 68 (Figs. 1 and 7) which underlies the apron and rests on a stud 69 threaded adjustably through the bottom of the rear part of carriage 52. In its backing off and return movements, the apron is guided by contact plates 70 and 71 (Fig. 12) on the carriage and bushing flange, respectively, and by a lateral contact surface 72 at the same side and rear portion of the apron. A stiff spring 73 seated in a pocket in the apron exerts force against the opposite side of the carriage and maintains the apron firmly against the guide surfaces 70 and 72. The rear wall of the carriage 52 is formed as a seat 74 complemental to the adjacent side of bushing 50 against which the latter is firmly held when cutting strokes are being performed. Backing off and return movements are imparted to the apron by a cam 75 (Fig. 8), called the back off cam, and cooperating springs, later described. The cam is secured to a shaft 76 and bears on a roller 77 carried by one arm of a lever 78, the other arm of which carries a gear segment 79 in mesh with a rack 80, made as a tubular screw or worm mounted on the apron. The tubular helical rack 80 is mounted rotatably in the apron 51 in axial alinement with the adjusting screw 61, but is withheld from relative endwise movement. A shaft extension 61a from screw 61 passes through the tubular rack 80 and carries splines 81 parallel to its axis in engagement with complemental internal splines in the rack. The threads of the screw 61 and rack 80 are equal in lead and opposite in inclination in order to permit adjustment of the carriage and apron without disturbing the back off lever 78.

The back off cam shaft 76 and pivot 82 for the back off lever are mounted in the turret structure with their axes parallel (vertical in this instance), shaft 76 being supported by bearings. The mounting for one of the cam shafts is shown at 83 in Fig. 1, the spindle apron with which cam 75 there shown is related being at the opposite side of the turret axis from the spindle S shown in that figure. The springs which cooperate with the back off cam are shown at 84 in Fig. 1. They are arranged to react between the apron and its carriage so as to take up backlash between the rack 80 and segment 79 and maintain the roller 77 in contact with the back off cam. They exert constant force tending to withdraw the apron from the seat 74, and effective to do so when permitted by the low part of the cam. A bar 85 is secured to the sides of the apron carriage 52 overlying and holding down the apron.

The work pieces may be secured to the work spindles by various means. One such means is shown in Fig. 1 consisting of a head stock 86 secured to the apron so as to overhang the spindle, having a sliding clamp or center movable toward and away from the spindle by an arm 87, and a holding clamp for the slide operable by an arm 88. A pan 89 is arranged adjacent to the spindle to catch lubricating fluid and chips and conduct them to a central passageway 90 through the hub of the turret. The matter issuing from this passageway is deflected by a surface 91 into the housing 92 of a screw conveyer 93 which is driven by an electric motor 94 through a sprocket and chain drive 95.

A comprehensive diagram of the driving mechanisms, showing the interrelation of the various parts is given by Fig. 19. This figure shows the motor 33, which may be called the stroke motor, and the train, previously described, by which it reciprocates the cutter spindle 28. It also shows another electric motor 96, which may be called the feed motor, from which power is furnished to drive the turret, work spindles, back-off cam, and cams for actuating control switches later described.

Feed motor 96, through a chain and sprocket drive 97 drives a shaft 98 (see also Figs. 2 and 3) which through ratio gears 99, 100, shaft 101, change gears 102, 103, shaft 104, gears 105, 106, shaft 107 and bevel gear pair 108, drives a shaft 109. The latter shaft carries a bevel gear 110 (shown also in Figs. 5 and 7) in mesh with a bevel gear 111 on shaft 112 from which power is delivered through bevel gear pair 113 to a shaft 114 which carries the turret driving worm 115 in mesh with the turret worm wheel 25.

Shaft 109 carries also the first element, 116, of a train of change gears 116, 117, 118 and 119, the last of which is mounted on a shaft 120 which drives a large ring gear 121 through bevel gears 122, a shaft 123 and a pinion 124 on shaft 123 meshing with internal teeth of ring gear 121. Ring gear 121, which for convenience of this description may be called the spindle gear, is supported on the platen 21 in bearings coaxial with the turret (Fig. 1) for rotation independently thereof, and it is provided with external teeth meshing with a series of pinions 125 (Fig. 13) spaced around the axis conformably with the spacing of the work spindles S. Each pinion 125 is associated with one of the work spindles and drives such spindle through a shaft 126, bevel gears 127, shaft 128 and worm 129 (carried by a bearing 129l secured to spindle apron 51), in mesh with a worm gear 130 on the spindle. Shaft 128 is in splined connection with worm 129 to permit backing off movements and radial adjustments of the spindle.

The back off cams 75 are all driven in unison with the strokes of the cutter, and with compensation for rotation of the turret, by both of the driving means previously described. Crank shaft 34 drives a shaft 131 by a sprocket and chain drive 132, and shaft 131 drives an alined shaft 133 through differential gearing contained in a rotatable housing 134. Shaft 133 drives a ring gear 135, here called for convenience the back off ring gear, through bevel gears 136, a shaft 137 and a pinion 138 meshing with internal teeth on said ring gear. The back off ring gear is shown in Fig. 1 as supported on the spindle gear 121 in coaxial relation therewith for independent rotation. It is provided with external teeth which mesh with pinions 139 on all of the several back off cam shafts 76.

The gearing between the crank shaft 34 and back off cam shaft 76 is of a combined ratio such that, if the differential gear housing 134 were stationary, the cam shafts 76 would make one rotation with each cycle of cutting and return strokes of the cutter (or a fraction of one rotation equal to the reciprocal of the number of lobes of the cams if multi-lobed cams are provided). But, as the cams are carried in an orbit by the turret and their pinions 139 are in rolling mesh with the back off ring gear 135, a compensatory incremental rotation must be imparted to that ring gear to eliminate error in the timing of the cams due to such planetary movement. This compensation or correction is effected by imparting rotation to the differential housing 134 from the feed motor 96 through shaft 107, sprocket and chain drive 141, shaft 142 and worm 143 which meshes with a worm gear 144 secured to the housing 134.

The structure and physical relationship of the mechanisms thus comprehensively represented in the diagram (Fig. 19) are shown in partial assemblages in other figures of the drawings.

One of the important novel features of the invention is the provision of means by which the operator is notified whenever a spindle reaches the gap in the cutter and a safeguard is afforded to prevent spoilage of a work piece which may not be properly loaded on the spindle. The machine is equipped with the usual start and stop switches, $a$ and $b$ respectively (Fig. 18), arranged for manual operation to start and stop the stroke and feed motors. In addition it is provided with automatically operated limit switches 146 and 147 (Fig. 14), which are inter-connected in circuit with an electric lamp $l$ or other suitable signal device placed where it will attract the operator's attention when activated, with the circuit of feed motor 96, and with automatic control devices. These switches are actuated by cams 148 and 149 (see also Fig. 7) on a shaft 150 which is driven from shaft 109 (Figs. 7 and 19) by bevel gear pair 151, shaft 152, pinion 153, face gear 154, shaft 155, worm 156 and worm gear 157 on shaft 150. Cams 148 and 149 are appropriately timed with the rotation of the turret to cause limit switch 146 to be closed when each work spindle S arrives in loading position at the nearer end of the cutter gap G. This causes the lamp $l$ to be lighted and, through a shunt circuit, to remain lighted after the cam passes the switch and while the spindle traverses the gap. When the spindle nearly reaches the farther end of the gap, cam 149 operates the limit switch 147 to close circuits which cause the feed motor to stop, if the starting switch $a$ is not first closed by the operator.

The gap is long enough to afford time, during its traverse by a spindle, for the operator to remove a finished work piece and place a blank piece on the spindle before cam 149 actuates switch 147, in normal operation. But if there should be excessive delay in loading of the blank, switch 147 would cause the feed motor to stop before the spindle had advanced into cutting relation with the initial group of cutter teeth $t^1$. But the feed motor can be started by closing the starting switch a after such stoppage and, if the starting switch is closed before the feed motor has been thus stopped, closing of the limit switch 147 is made ineffective to stop the feed motor.

The circuits through which the switches here described are interconnected with the motors, the signal device and intermediate contactors and automatic controllers are of standard character, well known and understood by those skilled in the electrical arts, wherefore it is deemed unnecessary to show them in detail. It is sufficient for this disclosure to make clear that the machine is provided with suitable electrical connections to perform the actions described.

The interchangeable cutters employed with this machine are large and heavy (16 inches more or less in pitch diameter), of ring form, and are centered on the adapter 32 by an internal beveled surface 159 and secured thereto by screws 160 (Fig. 1). To facilitate mounting and removing the cutters, I have provided a novel jack device shown partially in the last named figure and fully, on a larger scale, in Fig. 15. The jack comprises a spider 161 supported centrally on the upper face of the turret and having a central tubular part 162 which extends into the central passageway 90 of the turret and is centered therein by a tube 163 rising from a point on the base centrally beneath the turret hub. Spaces are left between the rim and arms of spider 161 and the tube 162 wide enough to permit free flow of lubricant and chips from the pan 89. A nut 164 is mounted and secured in the upper end of the tube 162, through which passes an externally and internally threaded sleeve 165 of which the external threads mesh with the nut. A screw rod 166 is contained in the sleeve 165 engaging the internal threads thereof and it carries a disk 167 on its upper end.

A face gear 168 is mounted rotatably in the tubular part 162, having a hub portion which occupies a bearing therein and surrounds the threaded sleeve 165. It carries a key 1681 which projects into a longitudinal groove in the side of sleeve 165 forming a splined connection. A pinion 169 mounted in a bearing in the side of the tube 162 meshes with face gear 168 and has a projecting shank carrying a non-circular head on its outer end. When it becomes necessary to raise a cutter to the spindle adapter 32, or lower a cutter therefrom, a socket wrench 171, to which a crank 172 having a long shank is connected by means of a universal joint 173, is applied to the head 170 and rotated in the appropriate direction. At such times the cutter is supported and centered by a circular plate 175 which is laid on disk 167.

The screw rod 166 and the internal threads of the screw sleeve 165 may be of opposite hand from the external thread of the sleeve and the thread of nut 164, or of the same hand with a shorter lead, according as it may be desired to raise and lower the cutter with augmented motion or a differential motion. It has been found that the weight and inertia of the cutter are ordinarily sufficient to prevent rotation of the screw rod with the sleeve 165; but any tendency to rotate can be checked by the operator. However, it is within my contemplation to apply positive means for withholding the screw rod from rotation.

What I claim is:

1. A planetary gear shaping machine comprising a supporting structure, a turret mounted to rotate thereon, a cutter spindle mounted to reciprocate along the axis of the turret, a circular gear shaper cutter connected with said spindle concentrically, having peripheral planing teeth and a toothless gap at one side, a number of work spindles rotatably supported on the turret in positions for holding work pieces in operative relationship to the cutter, means for rotating the turret, means for simultaneously rotating the work spindles relative to the turret at a rate corresponding to the pitch circle ratios of the cutter and work pieces, means for stopping the rotation of the turret when each work spindle approaches the further limit of such gap after having passed the nearer limit thereof, means for starting rotation of the turret, and means interconnecting said stopping and starting means to cause actuation of said stopping means should said starting means remain inoperative.

2. A planetary gear shaping machine comprising a supporting structure, a turret mounted to rotate thereon, a cutter spindle mounted to reciprocate along the axis of the turret, a circular gear shaper cutter connected with said spindle concentrically, having peripheral planing teeth and a toothless gap at one side, a number of work spindles rotatably supported on the turret in positions for holding work pieces in operative relationship to the cutter, an electric motor geared to the turret for imparting rotary movement thereto, mechanism driven in unison therewith for rotating the work spindles at angular velocities and in directions such as to rotate work pieces carried thereby with respect to the cutter in the same manner as a planet gear rotating in mesh with its sun gear, an electric signal device, switches coupled in controlling relation with said motor and signal device respectively, means driven in timed relation with the rotation of the turret for actuating said signal device and causing the motor to stop while each work spindle is adjacent to the toothless gap of the cutter, means for starting said motor, and means interconnecting said starting and stopping means to cause actuation of said stopping means should said starting means remain inoperative.

3. A planetary gear shaper comprising a supporting structure, a cutter spindle mounted for axial reciprocating motion, a circular gear shaper cutter secured to said spindle coaxially therewith, having a peripheral series of planing teeth and a toothless gap at one side, a turret mounted on the supporting structure to rotate about an axis in alinement with the cutter spindle axis, work spindle aprons supported on the turret, a work spindle carried by each of said aprons in position to hold a work piece up to the cutter for being incised therewith and to carry it around the circuit of the cutter teeth, said apron being movable radially on the turret for backing off the work spindle and returning it to cutting position in time with return strokes and cutting strokes, respectively, of the cutter spindle, a back off ring gear coaxially disposed with respect to the turret, cutter spindle reciprocating means, turret and work spindle rotating means, mechanism driven by the two last named means for rotating said back off gear, and connections through which said back gear causes backing off and return movements of the several work spindle aprons.

4. A planetary gear shaped comprising a supporting structure, a cutter spindle mounted for axial reciprocating motion, a circular gear shaper cutter secured to said spindle coaxially therewith, having a peripheral series of planing teeth and a toothless gap at one side, a turret mounted on the supporting structure to rotate about an axis in alinement with the cutter spindle axis, work spindle aprons supported on the turret, a work spindle carried by each of said aprons in position to hold a work piece up to the cutter for being incised thereby and to carry it around the circuit of the cutter teeth, said apron being movable radially on the turret for backing off the work spindle and returning it to cutting position in time with return strokes and cutting strokes, respectively, of the cutter spindle, a back off ring gear coaxially disposed with respect to the turret, cutter reciprocating means, turret and work spindle rotating means, mechanism driven by the last named means for rotating said back off ring gear, connections through which said back off ring gear causes backing off and return movements of the several work spindle aprons, a controller for said turret rotating means, and mechanism actuated in time with the rotation of the turret for operating said controller to stop the turret rotating means when each work spindle arrives at a prescribed point adjacent to the toothless gap of the cutter.

5. A planetary gear shaping machine comprising a supporting structure, a cutter spindle mounted to reciprocate endwise in said structure, a circular gear shaped cutter detachably secured to one end of said spindle, a turret mounted on the supporting structure rotatably thereon in axial alinement with the cutter spindle, work spindles carried by the turret in locations spaced around said axis for holding work pieces in cutting relation to the cutter and carrying such work pieces around the cutter, means for reciprocating the cutter spindle, means for rotating the turret, means for rotating the spindles relatively to the turret around their own axes in planetary timing with respect to the cutter, a jack mounted on the turret centrally thereof, and means for moving said jack toward and away from that part of the cutter spindle on which the cutter is mounted, said jack being adapted to support the cutter concentrically with the spindle when the cutter is detached from the spindle and carry it toward or away from the spindle.

6. A planetary gear generating machine comprising a supporting structure, a cutter spindle mounted on said structure for axial reciprocation in a substantially vertical path, a circular cutter secured detachably to the lower end of said spindle having peripheral planing teeth and a toothless gap at one side, a turret mounted on the supporting structure below the cutter and arranged to rotate about an axis alined with the cutter spindle axis, a jack mounted on the turret coaxially therewith, mechanism for moving said jack axially toward and away from the cutter spindle so as to lift a cutter toward the spindle or lower a cutter therefrom, work spindle aprons mounted on the turret around the axis thereof with provisions for backing off movement away from the axis and return movement toward the axis, a work spindle carried by each apron adapted to support a work piece in position to be acted on by the cutter and to carry the work piece around the cutter, means for backing off and returning the several aprons comprising back off cams, each disposed to impart motion to one of the aprons, cutter spindle reciprocating means, turret and work spindle rotating means, and mechanism controlled by both of said last named means and the cutter spindle reciprocating means for rotating said back off cams in time with the reciprocations of the cutter spindle.

7. A planetary gear generating machine comprising a supporting structure, a cutter spindle mounted on said structure for axial reciprocation in a substantially vertical path, means for reciprocating said cutter spindle, a circular cutter secured to the lower end of said spindle having peripheral planing teeth and a toothless gap at one side, a turret mounted on the supporting structure below the cutter and arranged to rotate about an axis alined with the cutter spindle axis, a jack mounted on the turret coaxially therewith, mechanism for moving said jack axially toward and away from the cutter spindle so as to lift a cutter toward the spindle or lower a cutter therefrom, work spindle aprons mounted on the turret around the axis thereof with provisions for backing off movement away from the axis and return movement toward the axis, a work spindle carried by each apron adapted to support a work piece in position to be acted on by the cutter and to carry the work piece around the cutter, means for backing off and returning the several aprons comprising back off cams, each disposed to impart motion to one of the aprons, cutter spindle reciprocating means, turret and work spindle rotating means, mechanism controlled by both of said last named means for rotating said back off cams in time with the reciprocations of the cutter spindle, and stop means organized to interrupt the turret driving means when each work spindle is in a predetermined position adjacent to the toothless gap of the cutter.

8. A planetary gear generating machine comprising a supporting structure, a cutter spindle mounted to reciprocate axially on said structure, a circular gear shaper cutter secured to one end of said spindle, a turret mounted to rotate on the supporting structure about an axis alined with the cutter spindle axis, work spindle aprons mounted on the turret with provisions for backing off and return movements away from and toward said axis, a work spindle mounted in each of said aprons arranged to hold and carry a work piece in planetary cutting relationship to the cutter, means for so moving the aprons comprising backoff cams, each disposed to impart movement to one of the aprons, a back off gear mounted coaxially with the turret in geared connection with all of said cams for rotating the latter when rotated itself, motive means coupled with the cutter spindle for reciprocating it, other motive means coupled with the turret and work spindles for rotating the turret and spindles, mechanism including a differential gear between the spindle reciprocating means and back off gear for imparting rotation thereto in timed relation with reciprocations of the cutter spindle, and mechanism driven by the turret rotating means for transmitting rotation to said differential gear in a measure to obviate error in the timing of the backoff cam due to rotation of the turret.

9. In a planetary gear generating machine, the combination with a reciprocating cutter spindle, a circular cutter carried thereby, and a turret rotatable about the axis of the cutter, of a work spindle apron carrier mounted on the turret with provision for substantially radial adjustment thereon, a work spindle apron mounted on said carrier and relatively reciprocable thereon away from and toward the turret axis for backing off and returning work to cutting position, a work spindle mounted rotatably on said apron, a helical rack mounted rotatably on the apron with its axis extending radially of the turret, a backing off lever including a gear segment in mesh with the helical rack, a backing off cam arranged to act on said lever for imparting movement to the apron, and an adjusting screw coaxial with said helical rack mounted on the turret and in threaded connection with the apron carrier for adjusting the spindle toward or away from the turret axis, said screw being in splined connection with the helical rack and being of equal lead and opposite inclination to the thread of the helical rack.

10. In a machine of the character described, a supporting structure, a turret mounted thereon, a number of spindles rotatably supported on the turret in locations spaced around the axis of said turret, means for rotating said turret, means for rotating the spindles relatively to the turret about their own axes in planetary timing with respect to the rotation of the turret, means for backing off said spindles comprising backoff cams, means for moving said backoff cams, and means to impart an incremental movement to said cams to compensate for movement of said spindles about the axis of said turret.

11. In a machine of the character described, a supporting structure, a turret mounted thereon, a number of spindles rotatably supported on the turret in locations spaced around the axis of said turret, means for rotating said turret, means for rotating the spindles relatively to the turret about their own axes in planetary timing with respect to the rotation of the turret, means for backing off said spindles including backoff cams rotatably mounted with respect to said spindles, means for rotating said backoff cams and means to impart an incremental rotation to said backoff cams to compensate for movement of said spindles about the axis of said turret.

12. In a machine of the character described, a supporting structure, a turret mounted thereon, a number of spindles rotatably supported on the turret in locations spaced around the axis of said turret, means for rotating said turret, means for rotating the spindles relatively to the turret about their own axes in planetary timing with respect to the rotation of the turret, means for backing off said spindles including a backoff ring gear rotatably mounted on the supporting structure, backoff cams geared to said ring gear, means to rotate said ring gear and means to impart an additional rotation to said ring gear to compensate for movement of said spindles about the axis of said turret.

13. A gear shaper comprising a supporting structure, a cutter spindle mounted for axial reciprocating motion, a gear shaper cutter secured to said spindle coaxially therewith, a work support adjacent to said cutter spindle, a work carriage mounted on said work support, guide means for said carriage so that said carriage may be moved toward and away from said cutter spindle, means to move said carriage, a work holding apron slideably mounted in said carriage, a backoff cam rotatably mounted in said work support and means between said backoff cam and said apron so as to impart backoff motion to a work spindle rotatably journaled in said apron.

14. A machine of the character described comprising a supporting structure, a cutter spindle mounted on said structure for axial reciprocation, a circular cutter secured to the lower end of said spindle having peripheral planing teeth thereon, a turret mounted on the supporting structure below the cutter and arranged to rotate about an axis alined with the cutter spindle axis, work aprons mounted on the turret around the axis thereof with provision for backing off movement away from the axis and return movement toward the axis, work spindles carried by each apron adapted to support a work piece in position to be acted on by the cutter and to carry the work piece around the cutter, means for backing off and returning the several aprons comprising backoff cams, each disposed to impart motion to one of the aprons, cutter spindle reciprocating means, turret and work spindle rotating means and mechanism controlled by both of said last-named means and the cutter spindle reciprocating means for rotating said backoff cams in time with the reciprocations of the cutter spindle.

15. A planetary gear shaping machine comprising a supporting structure, a turret mounted to rotate thereon, a cutter spindle mounted to reciprocate along the axis of the turret, a circular gear shaper cutter connected with said spindle concentrically, having peripheral planing teeth and a toothless gap at one side, a number of work spindles rotatably supported on the turret in positions for holding work pieces in operative relationship to the cutter, means for rotating the turret, means for simultaneously rotating the work spindles relative to the turret at a rate corresponding to the pitch circle ratios of the cutter and work pieces, means for starting rotation of the turret and means operative to stop the rotation of said turret in the event that said starting means should not be actuated when each work spindle approaches the further limit of such gap.

EDWARD W. MILLER.

References Cited in the file of this patent

UNITED STATES PATENTS

| Number | Name | Date |
|---|---|---|
| 1,990,240 | Miller | Feb. 5, 1935 |
| 2,029,398 | Sykes | Feb. 4, 1936 |
| 2,161,365 | Martin | June 6, 1939 |

OTHER REFERENCES

"The Gap-Type Cutter," published by The Fellows Gear Shaper Co., printed in 1938.